United States Patent

Matsumura et al.

[11] Patent Number: 6,157,869
[45] Date of Patent: Dec. 5, 2000

[54] MACHINING PROGRAM CHECKING METHOD FOR A NUMERICAL CONTROL DEVICE

[75] Inventors: Teruyuki Matsumura, Hachioji; Satoru Shinozaki, Shimodate; Takahiko Endo, Oshino-mura, all of Japan

[73] Assignee: Fanuc Ltd., Yamanashi, Japan

[21] Appl. No.: 08/244,633

[22] PCT Filed: Oct. 4, 1993

[86] PCT No.: PCT/JP93/01419

§ 371 Date: Jun. 6, 1994

§ 102(e) Date: Jun. 6, 1994

[87] PCT Pub. No.: WO94/07649

PCT Pub. Date: Apr. 14, 1994

[30] Foreign Application Priority Data

Oct. 6, 1992 [JP] Japan ............................ 4-290873

[51] Int. Cl.[7] .................................................. G06F 19/00
[52] U.S. Cl. ............................................ 700/178; 700/169
[58] Field of Search ............................... 700/176, 177, 700/178, 169, 86; 703/22

[56] References Cited

U.S. PATENT DOCUMENTS

| | | | |
|---|---|---|---|
| 4,513,366 | 4/1985 | Munekata et al. | 364/474.2 |
| 5,079,713 | 1/1992 | Kawamura et al. | 364/474.2 |
| 5,122,966 | 6/1992 | Jansen et al. | 364/474.2 |
| 5,127,140 | 7/1992 | Oiwa et al. | 29/27 C |
| 5,317,519 | 5/1994 | Maeda | 364/474.26 |

FOREIGN PATENT DOCUMENTS

| | | |
|---|---|---|
| 0 104 409 | 8/1983 | European Pat. Off. . |
| 2 492 716 | 10/1981 | France . |
| 4-111748 | 4/1992 | Japan . |
| 4-21209 | 4/1992 | Japan . |
| 2 089 068 | 6/1982 | United Kingdom . |

*Primary Examiner*—Paul P. Gordon
*Attorney, Agent, or Firm*—Staas & Halsey LLP

[57] ABSTRACT

A machining program checking method is provided for a numerical control device which controls an NC lathe for performing a machining operation with a plurality of tools simultaneously mounted on a turret thereof, wherein interference of the tools with a workpiece or with various parts of the lathe can be surely detected before the machining operation is actually executed. During creation or simulation of a machining program, all tools n defined and mounted on the turret A are detected the relationship of relative position between a tool m currently in use and each of the other tools n is obtained the current position of each of the tools n is obtained based on the machining program defined with respect to the tool m and the relationship of relative position a determination is made as to whether each of the tools n interferes with the region of the workpiece B or chuck C, and an alarm or the like is displayed in accordance with the result of the determination, thereby checking the interference of the tools before the machining operation is carried out.

3 Claims, 4 Drawing Sheets

MACHINING PROGRAM CHECKING METHOD FOR A NUMERICAL CONTROL DEVICE

TECHNICAL FIELD

The present invention relates to a machining program checking method for a numerical control device, and more particularly, to an improved machining program checking method for a numerical control device used with an NC turret lathe having a plurality of tools mounted thereon.

BACKGROUND ART

There is known a machining program checking method for a numerical control device, wherein movement of a tool and cutting of a workpiece are simulated or interference between the tool and the workpiece is checked, on the bases of a machining program and data relating to the mounting of the tool specified in the machining program as a tool to be used.

In the conventional machining program checking method, however, only the tool currently in use is checked for interference. Thus, in the case of a machine tool such as a turret lathe which performs a machining operation with a plurality of tools simultaneously mounted thereon, it is probable that, even when the tool currently in use is not interfering with the workpiece, other tools mounted on the turret may interfere with the workpiece or parts of the lathe.

Conventionally, whether such interference occurs or not is determined through the operator's thought experiment at the time of preparation of a program or simulation of tool paths, but the operator's determination cannot always be perfect. If combination, disposition or the like of the tools mounted is improper, interference of tools may occur, causing damage to tool noses or to the workpiece, displacement of the spindle, etc.

SUMMARY OF THE INVENTION

The present invention provides a machining program checking method for a numerical control device which controls an NC turret lathe for performing a machining operation with a plurality of tools simultaneously mounted thereon, wherein interference of the tools with a workpiece or with various parts of the lathe can be surely detected before the machining operation is actually executed.

The machining program checking method according to the present invention comprises a step of obtaining a relationship of relative position between a tool which is specified as a tool to be used currently by a machining program and each of other tools mounted on the turret, a step of simulating movement of each of the other tools in accordance with the relationship of relative position between the currently used tool and each of the other tools, the machining program, and mounting data of each of the other tools, and a step of detecting interference of each of the tools mounted on the turret with a workpiece, and interference of each of the tools with various parts of the NC lathe.

BRIEF DESCRIPTION OF THE DRAWINGS

FIG. 2b is a side view illustrating the relationship between the workpiece and tool shown in FIG. 2a;

BRIEF DESCRIPTION OF THE PREFERRED EMBODIMENTS

Figure 1:
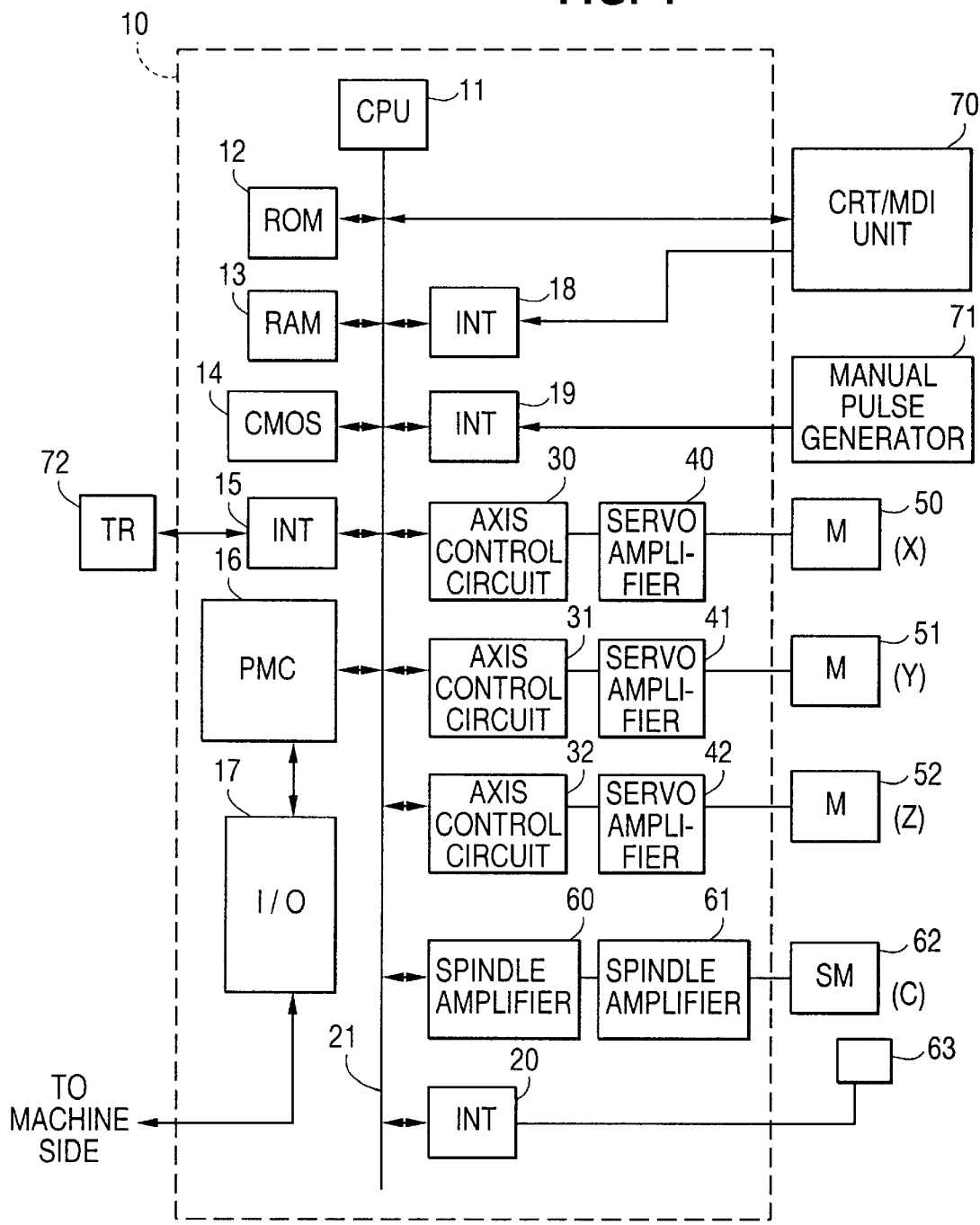
FIG. 1 is a block diagram illustrating the hardware of a numerical control device for carrying out a method according to an embodiment of the present invention.

Referring first to FIG. 1, the hardware of a numerical control (NC) device 10 for carrying out a method according to the present invention will be described. A CPU 11 is a processor for generally controlling the NC device 10. The CPU 11 is connected to a ROM 12 via a bus 21 and controls the NC device 10 in accordance with system programs stored in the ROM 12. Previously written in the ROM 12 are various system programs such as those for executing an editing mode processing necessary for the preparation and editing of NC machining programs, a playback mode processing for automatic operation, and a processing necessary for checking tool interference. A RAM 13 stores temporary calculation data, display data, and various data entered by the operator through a CRT/MDI unit 70. A CMOS memory 14 comprises a nonvolatile memory which is backed up by a battery, not shown, so that the data stored therein can be retained even if the power supply to the NC device 10 is cut off. The CMOS memory 14 stores an NC machining program read through an interface 15, an NC machining program entered through the CRT/MDI unit 70, etc.

External equipment 72, which includes a paper tape reader, a paper tape puncher, an external storage device, etc., is connected to the NC device 10 via the interface 15. An NC machining program or the like is read from the paper tape reader or the external storage device, and the NC machining program edited by means of the NC device 10 is outputted to the paper tape puncher or to the external storage device.

A PMC (programmable machine controller) 16 controls auxiliary devices associated with an NC turret lathe, such as an actuator for a robot hand for changing tools, in accordance with a sequence program stored in the NC device 10 beforehand. More specifically, using the sequence program, the PMC 16 converts data into signals necessary for the auxiliary devices, in accordance with M-, S- and T-functions specified in the NC machining program, and outputs the converted signals to the auxiliary devices through an input/output unit 17. The auxiliary devices including various actuators operate in accordance with the outputted signals. Also, the PMC 16 is supplied with signals from limit switches arranged on the main body of the NC turret lathe and the auxiliary devices, as well as signals from various switches on a control panel provided at the main body of the NC turret lathe, and the received signals are outputted to the CPU 11 after undergoing necessary processing.

Current position data of individual axes of the NC turret lathe, alarms, parameters, and image signals carrying image data etc. are supplied to the CRT/MDI unit 70 to be displayed in a graphics display thereof. The CRT/MDI unit 70 is a manual data input device provided with a keyboard, various software keys, etc. An interface 18 receives data from the keyboard of the CRT/MDI unit 70, and transfers the received data to the CPU 11. Interactive creation of NC machining programs, i.e., automatic programming, can be implemented by starting a system program for automatic programming, stored in the ROM 12, to thereby display an interactive image on the graphics display of the CRT/MDI unit 70, and to enter simple data relating to product shapes etc. An interface 19 is connected to a manual pulse generator 71 and receives pulses therefrom. The manual pulse generator 71 is mounted on the control panel of the NC turret lathe, and is used for accurately positioning the movable parts of the NC turret lathe through control of the individual axes by means of distribution pulses generated thereby according to manual operation.

Axis control circuits 30 to 32 are supplied with move commands for the respective axes from the CPU 11, and output the commands to servo amplifiers 40 to 42, respectively. On receiving the commands, the servo amplifiers 40 to 42 drive servomotors 50 to 52 for the respective axes to move a turret A (see FIG. 2*a*) of the NC turret lathe. The servomotors 50 to 52 of the individual axes each have a position detection pulse coder built therein, and a position signal from the pulse coder is fed back in the form of a pulse train. Alternatively, a linear scale may be used as the position detector. Also, by subjecting the pulse train to F/V (frequency-to-velocity) conversion, a velocity signal can be obtained. In FIG. 1, the feedback mechanism for the position and velocity signals and the mechanism associated with the swivel axis of the turret A are omitted.

A spindle control circuit 60 is supplied with a spindle rotation command for the NC turret lathe, and outputs a spindle velocity signal to a spindle amplifier 61. On receiving the spindle velocity signal, the spindle amplifier 61 rotates a spindle motor 62 of the NC turret lathe at the rotational speed as commanded. To the spindle motor 62 is coupled a position coder 63 through the gears, a belt or the like, and the position coder 63 outputs feedback pulses in synchronism with the rotation of the spindle. The feedback pulses are read by the CPU 11 via an interface 20. With the rotational position of the spindle set to a predetermined position specified by an NC machining program or the like, machining operation in the direction of Y axis can be performed with a tool mounted to the turret A. In such a case, a one-revolution signal from the position coder 63 is detected, and the CPU 11 carries out a control operation of the rotational position of a chuck C (see FIG. 3) mounted on the spindle, i.e., C-axis control, whereby the chuck C is stopped and held at the predetermined position.

Figure 2A:
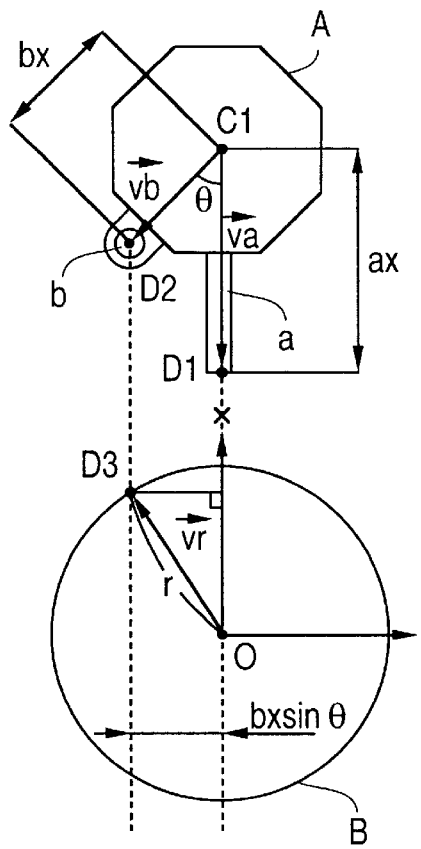
FIG. 2a is a front view illustrating the relationship between a workpiece mounted on a chuck of an NC turret lathe and a tool mounted on a turret.
Figure 2B:
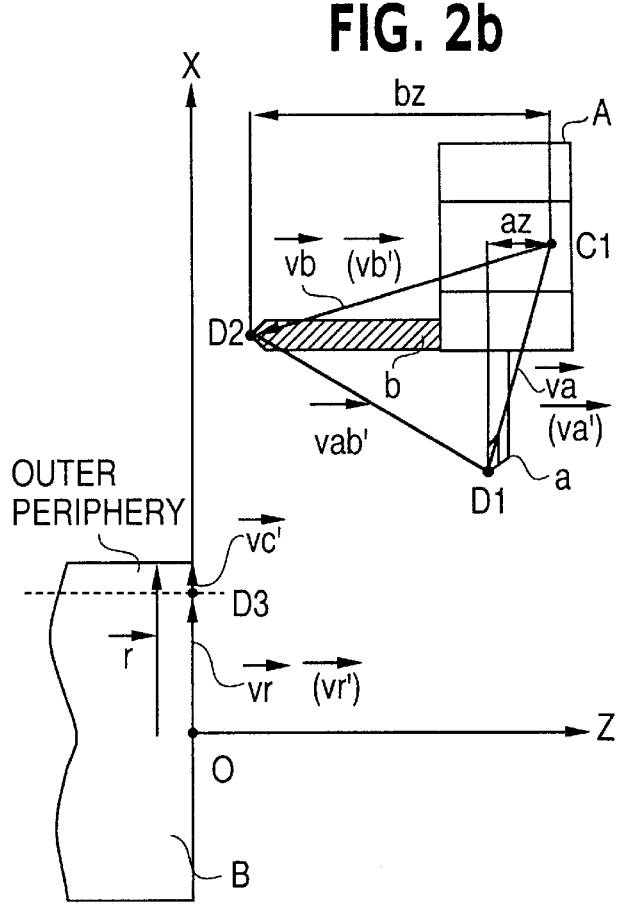

FIGS. 2*a* and 2*b* illustrate the relationship between the position of a workpiece B held by the chuck of the NC turret lathe and the position of the turret A, wherein FIG. 2*a* is a front view of the workpiece B and turret A, and FIG. 2*b* is a side view of the same elements.

Referring to FIGS. 2*a* and 2*b*, a method of this embodiment for obtaining the relationship of relative position between a tool currently in use and another tool b, both mounted on the turret A, will be explained.

As shown in FIGS. 2*a* and 2*b*, in the NC turret lathe of this embodiment, various axes are defined as follows: Z axis is in alignment with the axis of the spindle; origin O is coincident with a distal end of the workpiece B attached to the chuck C concentrically with the spindle; Y axis is a horizontal axis passing through the origin O and perpendicular to the Z axis; and X axis is a vertical axis passing through the origin O and perpendicular to both the Z and Y axes. The turret A revolves about a center C1 thereof in an X–Y plane.

Provided that a radial offset amount of the tool in use, a, from the center C1 of the turret A is ax (see FIG. 2*a*), and that an axial offset amount of the tool a from the center C1 of the turret A is az (see FIG. 2*b*), a vector $\vec{va}$ (x, y, z) directed from the center C1 of the turret A to a distal end D1 of the tool a is given as $$\vec{va}=(ax, O, az) \tag{1}$$

Further, provided that a radial offset amount of the tool b, which is not currently in use, from the center C1 of the turret A is bx (see FIG. 2*a*), an axial offset amount of the tool b from the center C1 of the turret A is bz (see FIG. 2*b*), and an offset angle of the tool b with respect to the tool a currently in use is θ (see FIG. 2*a*), a vector $\vec{vb}$ (x, y, z) directed from the center C1 of the turret A to a distal end D2 of the tool b is given as $$\vec{vb}=(bx \cos θ, bx \sin θ, bz) \tag{2}$$

Accordingly, a projection vector $\vec{va}'$ (x, z) obtained by projecting the vector $\vec{va}$ (x, y, z) onto the X–Z plane and a projection vector $\vec{vb}'$ (x, z) obtained by projecting the vector $\vec{vb}$ (x, y, z) onto the X–Z plane are respectively given as follows (see FIG. 2*b*):

$$\vec{va}'=(ax, az) \tag{3}$$

$$\vec{vb}'=(bx \cos θ, bz) \tag{4}$$

On the other hand, provided that the radius of the workpiece B is r, a vector $\vec{vr}$ (x, y, z) directed from the origin O to a position D3 at which the distal end D2 of the tool b, which is not currently in use, interferes with the outer periphery of the workpiece B (see FIGS. 2*a* and 2*b*) is given by $$\vec{vr}=(\sqrt{r^2-(bx \sin θ)^2}, bx \sin θ, O) \tag{5},$$

and a projection vector vr' (x, z) obtained by projecting the vector vr (x, y, z) onto the X–Z plane (see FIG. 2*b*) is given by $$\vec{vr}'=(\sqrt{r^2-(bx \sin θ)^2}, O) \tag{6},$$

Accordingly, given that a vector directed from the origin O in parallel with the X axis and having a magnitude of r is r, a vector $\vec{vc'}$ (x, z) on the X–Z projection plane which corresponds to the clearance between the outer periphery of the workpiece B and the interference position D3 (see FIG. 2b) is $$\vec{vc'} = r - \vec{vr'} \qquad (7)$$
$$= \left(r - \sqrt{r^2 - (bx\sin\theta)^2}, \; 0\right)$$

From equations (3) and (4), a vector $\vec{vab'}$ (x, z) on the X–Z projection plane which is directed from the distal end D1 of the tool a, which is currently in use, to the distal end D2 of the tool b, which is not currently in use, (see FIG. 2b) is given as $$\vec{vab'} = \vec{vb'} - \vec{va'} \qquad (8)$$
$$= (bx\cos\theta - ax, \; bz - az)$$

Then, from equations (7) and (8), a vector $\vec{U}$ (x, y) which is the sum of the vectors $\vec{vab'}$ (x, z) and $\vec{vc'}$ (x, z) is obtained as follows:

$$\vec{U} = \vec{vab'} + \vec{vc'} \qquad (9)$$
$$= (bx\cos\theta - ax + r - \sqrt{r^2 - (bx\sin\theta)^2}, \; bz - az)$$

In order to avoid the interference of the distal end D2 of the tool b, which is not currently in use, with the workpiece B, the x component of the above vector $\vec{U}$ (x, z) need to be greater than the distance from the distal end D1 of the tool a, which is currently in use, to the outer peripheral surface of the workpiece B.

That is, if the distal end of a vector indicating the current position of the distal end D2 of the tool b, which is obtained by adding the vector $\vec{U}$ (x, z) to the current position of the distal end D1 of the tool a (in consideration of the vector $\vec{vc'}$), is outside the region of the workpiece B, the distal end D2 of the tool b never interferes with the workpiece B.

Figure 3:
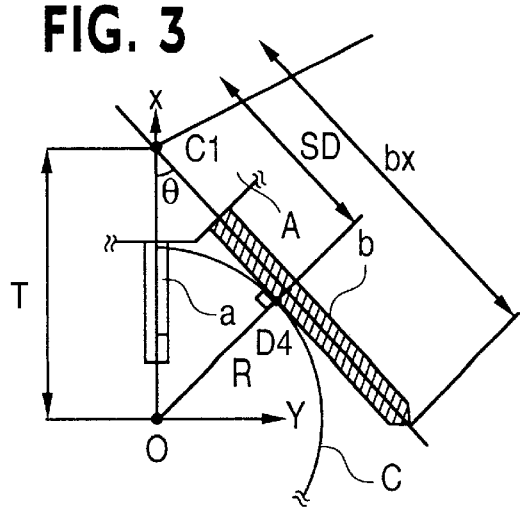
FIG. 3 is a conceptual diagram illustrating the relationship between the chuck and turret of the NC turret lathe.

FIG. 3 is a conceptual diagram illustrating the relationship between the chuck C and the turret A. In FIG. 3, provided that the radius of the chuck C is R, the radial offset amount of the tool b, which is not currently in use, from the center C1 of the turret A is bx, and that the offset angle of the tool b with respect to the tool currently in use is θ, the stem (any part between the base and the distal end) of the tool b interferes with the chuck C only when the radial offset amount bx of the tool b is greater than a distance SD between an intersection point, at which a straight line inclined at angle θ to the X axis in the X–Y plane and circumscribing the outer periphery of the chuck C with the radius R intersects the X axis, and the circumscribing point D4, i.e., $$SD = R \tan(90° - \theta) \leq bx \qquad (10),$$

and at the same time a distance T on the X–Y projection plane between the turret center C1 and the origin O is shorter than the hypotenuse R/sin θ of a right-angled triangle which is formed by the straight line inclined at θ to the X axis in the X–Y plane and circumscribing the outer periphery of the chuck C with the radius R, the radius R passing through the circumscribing point D4, and the X axis, i.e., $$T \leq R/\sin\theta \qquad (11)$$

In the foregoing, the conditions of interference of the tool b with the workpiece B and the chuck C have been described in relation to the currently used tools a and b. This applies also to the case where other tools are mounted on the turret, as well as to the case where interference of tools with the tailstock etc. of the NC turret lathe is checked. Based on the offset angles (θ) of the individual tools with respect to the tool currently in use, and the radial and axial offset amounts (bx, bz) of the individual tools from the center C1 of the turret A, the condition of interference of each of the tools with the chuck or tailstock can be obtained using an equation corresponding to the aforesaid equation (9), and the condition of interference of each of the tools with the workpiece or tailstock can also be derived using equations corresponding to the aforesaid expressions (10) and (11).

Figure 4:
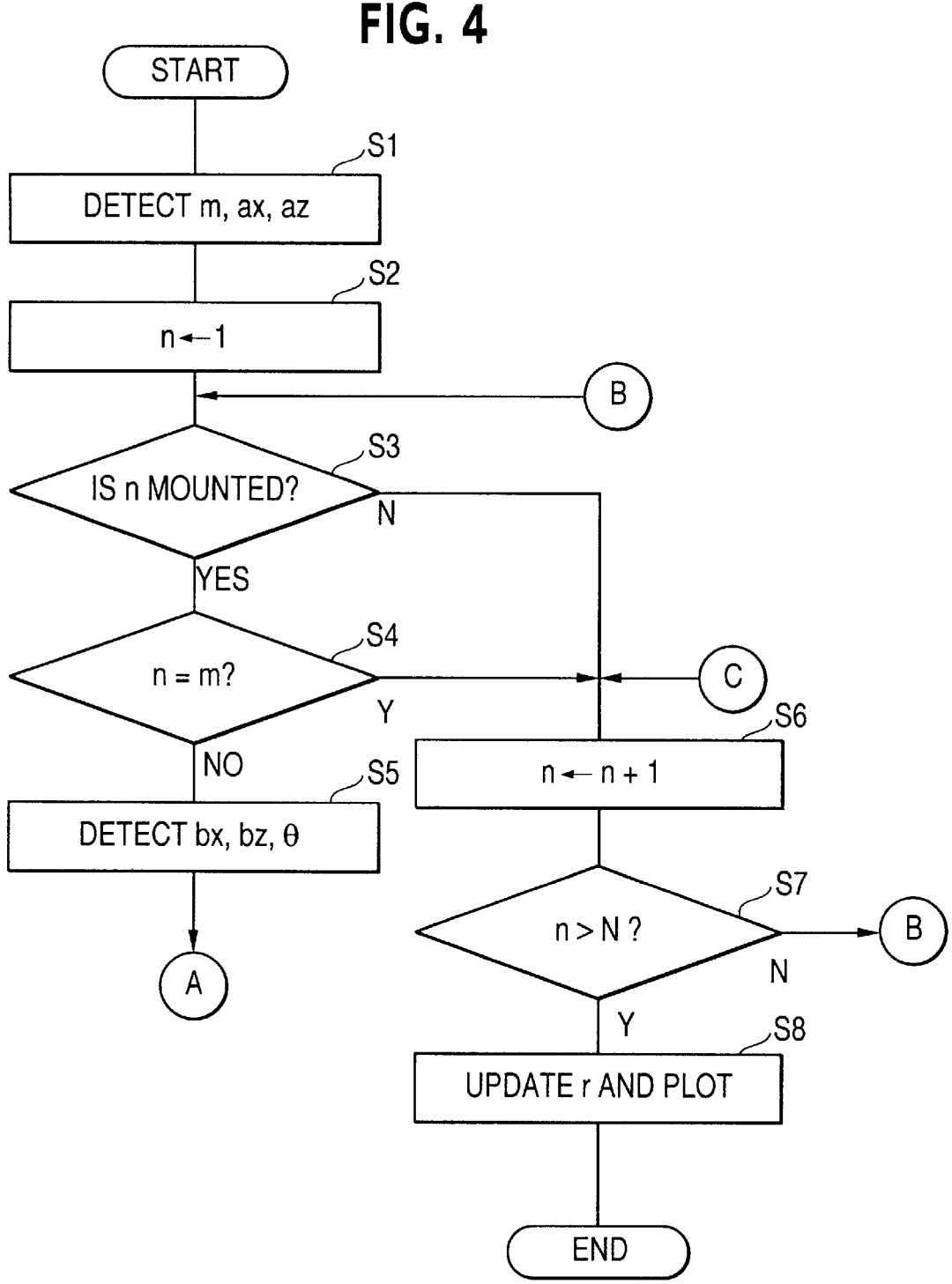
FIG. 4 is part of a flow chart showing the outline of an "interference check processing" to be executed by the numerical control device of the embodiment.
Figure 5:
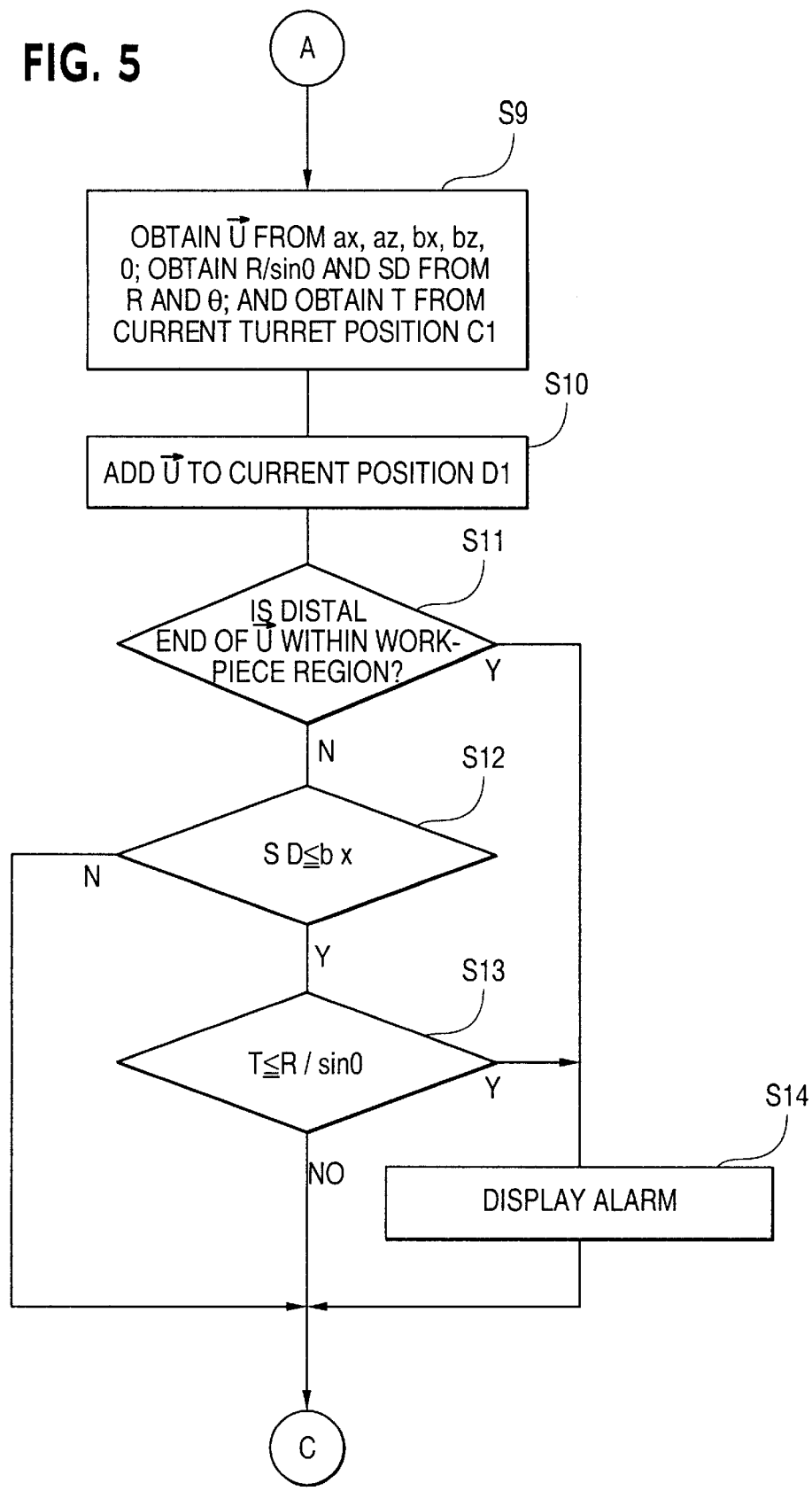
FIG. 5 is the continued part of the flow chart, subsequent to the part shown in FIG. 4.

The flow chart of FIGS. 4 and 5 illustrates an outline of an "interference check processing" for determining whether tools mounted on the turret A interfere with the workpiece B or with the chuck C.

Referring to the flow chart of FIGS. 4 and 5, the "interference check processing" according to this embodiment will be described. The processing for detecting the tool interference may be executed each time one block of a machining program is entered during preparation of the program, or at the time of simulation after creating the machining program corresponding to one machining step is completed. The "interference check processing" is repeatedly executed by the CPU 11 each time one block of turret move command (tool move command for cutting) is entered during creation of the program, or each time one block of turret move command is read during simulation of the machining program.

Immediately after starting the "interference check processing," the CPU 11 detects in step S1 a tool number m of the tool which is currently specified to be used by the program (corresponding to the tool a shown in FIGS. 2a, 2b and 3), and fetches and temporarily stores the offset amounts ax and az, tool diameter, etc. related to the tool with the number m, by referring to a tool file stored in the CMOS memory 14. Then, in Step S2, the CPU 11 sets an initial value of "1" for the tool number, in a register n for storing mounted tool data. The CPU 11 determines, in Step S3, whether the tool with the tool number n, indicated by the register n, is mounted on the turret A.

If the tool with the tool number n is not mounted on the turret A, the CPU 11 proceeds to Step S6, wherein the value of the mounted tool register n is incremented by "1", and then proceeds to Step S7. In Step S7, the CPU 11 determines whether the value of the register n has reached a maximum tool number N among the tool numbers associated with tools that are registered as tools to be mounted on the turret. If the maximum tool number N is not reached by the value of the register n, the CPU 11 returns to Step S3, and repeats a processing similar to that described above, based on the current value of the register n.

Even in the case where the tool with the tool number n is mounted on the turret A, and thus the result of the decision in Step S3 is Yes, the result of the decision in Step S4 becomes Yes where the tool with the tool number n is identical with the tool m currently in use. In such a case, the flow of processing proceeds to Step S6 to repeat aforementioned processing.

Thus, by repeating the processings in Steps S3, S4, S6 and S7, a tool n with the smallest tool number among the tools mounted on the turret A (corresponding to the tool b shown in FIGS. 2 and 3), except for the tool m currently in use, is detected.

If the result of the decision in Step S7 becomes Yes while the aforementioned processing is executed, it means that no tools but the tool m are mounted on the turret A, and so, it is unnecessary to check the interference in respect of other tools. In this case, in Step S8, the CPU 11 draws the path of the tool m currently in use and the cut state of the workpiece B on the display screen of the CRT/MDI unit 70, on the bases of the turret move command read in the present cycle, and ends the "interference check processing" after updating the value of the radius r of the workpiece B which varies as the cutting operation advances. Then, the CPU 11 waits for the entry of a one-block statement or for the reading of the subsequent block.

If, on the other hand, the result of the decision in Step S3 is Yes and at the same time the result of the decision in Step S4 is No, it means that another tool n than the tool m currently in use is mounted on the turret A, requiring the interference check of the tool n. In such a case, the CPU 11 proceeds to Step S5, wherein it fetches and temporarily stores the offset amounts bx and bz of the tool with the tool number n, the offset angle θ of the tool n with respect to the tool m currently in use, tool diameter, etc., by referring to the tool file and tool mounting data stored in the CMOS memory 14.

Subsequently, in Step S9, the CPU 11 obtains the aforesaid vector $\vec{U}$ by performing the calculation of equation (9) on the bases of the offset data ax and az of the tool m currently in use, the offset data bx and bz of the tool n mounted on the turret A, the offset angle θ of the tool n with respect to the tool m, and the radius r of the workpiece, as well as the distance T between the center Cl of the turret A and the origin O on the bases of the current position of the turret A given by the move command, and further R/sin θ (cf. expression (11)) and the distance SD (cf. expression (10)) on the bases of the radius R of the chuck and the offset angle θ.

Then, in Step S10, the CPU 11 calculates the current position of the distal end D2 of the tool n (taking the vector $\vec{vc'}$ into account), by adding the vector $\vec{U}$, obtained in Step S9, to the current position of the distal end D1 (cf. FIGS. 2a and 2b) of the tool m currently in use, which is given by the move command. It is then determined in Step S11 whether the distal end D2 of the tool n interferes with the region of the workpiece B having the radius r. If the result of the decision in Step S11 is Yes, the flow proceeds to Step S14, wherein an alarm message indicating the occurrence of interference is displayed on the display screen of the CRT/MDI unit 70. On the other hand, if there is no interference occurring, it is determined whether the comparison expressions in formulas (10) and (11) are both satisfied, i.e., whether the tool n interferes with the chuck C, on the bases of the values of R/sin θ, SD and T, obtained in Step S9, and the offset data bx of the tool n (Steps S12 and S13). Only when the comparison expressions are both satisfied, the flow proceeds to Step S14 to display an alarm message indicating the occurrence of interference on the display screen of the CRT/MDI unit 70.

Subsequently, the CPU 11 returns to Step S6, wherein the value of the mounted tool register n is incremented by "1", and then determines in Step S7 whether the value of the register n has reached the maximum number N among the tool numbers associated with the tools that are registered as tools to be mounted on the turret. If the result of the decision in Step S7 is No, the CPU 11 returns to Step S3 and repeats the processing described above, detects other tools mounted on the turret A successively in the ascending order of tool number n, and executes Step S5, Step S9 and the subsequent steps for each of the tools with the detected tool numbers n to check if there is any interference of each tool n with the workpiece B or with the chuck C. When interference is detected, an alarm message indicating the occurrence of interference is displayed on the display screen of the CRT/MDI unit 70.

If, while the above processing is repeatedly executed, the result of the decision in Step S7 becomes Yes and the tools mounted on the turret A are all examined with respect to interference by means of the move command, the CPU 11 proceeds to Step S8, wherein it plots the path of the tool m currently in use and the cut state of the workpiece B on the display screen of the CRT/MDI unit 70, on the bases of the turret move command read in the present cycle, and ends the "interference check processing" after updating the value of the radius r of the workpiece B which varies as the cutting operation advances. Then, the CPU 11 waits for the entry of a one-block statement or for the reading of the subsequent block.

According to the present invention, all other tools than the tool currently in use can be automatically checked as to whether they interfere with the workpiece or with the various parts of the NC lathe, whereby the interference check during creation of machining programs can be made easily and with high reliability to improve the efficiency of program creation.

What is claimed is:

1. A machining program checking method for a numerical control device which controls an NC lathe having a turret for carrying a plurality of tools thereon, comprising the steps of:
   (a) obtaining a relationship of relative position between a tool specified to be a tool in use by a machining program and each of other tools mounted on the turret;
   (b) simulating movement of each of said tools in accordance with the relationship of relative position obtained in said step (a), the machining program, and mounting data of each of said tools; and
   (c) detecting interference of each of said other tools mounted on the turret with a workpiece, and interference of each of said other tools with various parts of the NC lathe.

2. The machining program checking method for a numerical control device which controls an NC lathe having a turret for carrying a plurality of tools thereon, comprising the steps of:

(a) obtaining a relationship of relative position between a tool specified to be a tool in use by a machining program and each of other tools mounted on the turret;

(b) simulating movement of each of said tools in accordance with the relationship of relative position obtained in said step (a), the machining program, and mounting data of each of said tools; and (c) detecting interference of each of said other tools mounted on the turret with a workpiece, and interference of each of said other tools with various Darts of the NC lathe, wherein said step (a) comprises a step of obtaining a vector directed from a distal end of said tool in use to a distal end of each of said other tools, in accordance with offset data of said tool in use with respect to the turret, offset data of each of said other tools with respect to the turret, and an offset angle of each of said other tools with respect to said tool in use; and said step (c) comprises a step of determining whether or not the distal end of each of said other tools interferes with a region of the workpiece based on said vector.

3. The machining program checking method for a numerical control device which controls an NC lathe having a turret for carrying a plurality of tools thereon, comprising the steps of:

(a) obtaining a relationship of relative position between a tool specified to be a tool in use by a machining program and each of other tools mounted on the turret;

(b) simulating movement of each of said tools in accordance with the relationship of relative position obtained in said step (a), the machining program, and mounting data of each of said tools; and (c) detecting interference of each of said other tools mounted on the turret with a workpiece, and interference of each of said other tools with various parts of the NC lathe, wherein said step (c) comprises a step of determining whether or not each of said other tools interferes with the various parts of the NC lathe, based on a distance between a center of the turret and an axis of the workpiece, a radius of a chuck holding the workpiece, and an offset angle of each of said other tools with respect to said tool in use.

* * * * *

UNITED STATES PATENT AND TRADEMARK OFFICE
CERTIFICATE OF CORRECTION

PATENT NO. : 6,157,869
DATED : December 5, 2000
INVENTOR(S) : Matsumura et al.

Page 1 of 1

It is certified that error appears in the above-identified patent and that said Letters Patent is hereby corrected as shown below:

[75],
Change "Oshino-mura" to -- Minamitsuru --;

[57], ABSTRACT
Line 9, after "detected" insert -- ; --;
Line 11, after "obtianed" insert -- ; --; and
Line 13, after "position" insert -- ; --.

Column 4,
Equation (2), change "bx cos" to -- bxcos --; and change "bx sin" to -- bxsin --.
Equation (4), change "bx cos" to -- bxcos --.
Equation (5), change "bx sin" (both occurrences) to -- bxsin --.
Equation (6), change "bx sin" to -- bxsin --.

Column 5,
Equation (10), change "R tan" to -- Rtan --.

Column 9,
Line 12, change "Darts" to -- parts --.

Signed and Sealed this

Twenty-fifth Day of September, 2001

Attest:

NICHOLAS P. GODICI
Attesting Officer    Acting Director of the United States Patent and Trademark Office